(12) United States Patent
Lin et al.

(10) Patent No.: US 10,613,511 B2
(45) Date of Patent: Apr. 7, 2020

(54) TOOL MACHINE SERVO CONTROL SIMULATION DEVICE AND ESTABLISHING METHOD OF STRUCTURE MODEL

(71) Applicant: INDUSTRIAL TECHNOLOGY RESEARCH INSTITUTE, Hsinchu (TW)

(72) Inventors: Jheng-Jie Lin, Tiachung (TW); Jen-Ji Wang, Taichung (TW); Kuo-Hua Chou, Zhubei (TW); Chien-Chih Liao, Taichung (TW); Hsiao-Chen Ho, Taoyuan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 29 days.

(21) Appl. No.: 15/853,339

(22) Filed: Dec. 22, 2017

(65) Prior Publication Data
US 2019/0196444 A1    Jun. 27, 2019

(51) Int. Cl.
*G05B 19/408* (2006.01)
*G05B 19/39* (2006.01)
(Continued)

(52) U.S. Cl.
CPC .......... *G05B 19/408* (2013.01); *G05B 17/02* (2013.01); *G05B 19/39* (2013.01); *G05B 19/4145* (2013.01); *G05B 2219/42163* (2013.01)

(58) Field of Classification Search
CPC ............... G05B 11/42; G05B 13/042; G05B 19/40937; G05B 2219/35488;
(Continued)

(56) References Cited

U.S. PATENT DOCUMENTS 6,198,246 B1   3/2001   Yutkowitz
6,259,221 B1   7/2001   Yutkowitz
(Continued)

FOREIGN PATENT DOCUMENTS

CN   101231517 A   7/2008
CN   100449933 C   1/2009
(Continued)

OTHER PUBLICATIONS

Prasad et al., "Condition Monitoring of CNC Machining Using Adaptive Control," International Journal of Automation and Computing, 10(3), Jun. 2013, pp. 202-209.
(Continued)

*Primary Examiner* — Chun Cao
(74) *Attorney, Agent, or Firm* — Muncy, Geissler, Olds & Lowe, P.C.

(57) ABSTRACT

A tool machine servo control simulation device and an establishing method of structure model are provided. The tool machine servo control simulation device includes a structure model and a processor. The structure model includes a position function, a velocity function and a drive property parameter. The processor includes a control signal receiver and a simulation component. The control signal receiver is used for receiving a servo command. The simulation component, response to the servo command, generates a simulation path according to the position function, the velocity function and the drive property parameter.

9 Claims, 5 Drawing Sheets

(51) Int. Cl.
*G05B 17/02* (2006.01)
*G05B 19/414* (2006.01)

(58) Field of Classification Search
CPC ........... G05B 2219/36284; G05B 2219/36513; G05B 19/408; G05B 19/4145; G05B 17/02
See application file for complete search history.

(56) References Cited

U.S. PATENT DOCUMENTS

| | | | |
|---|---|---|---|
| 6,597,142 B2* | 7/2003 | Shibukawa | G05B 19/40937 318/567 |
| 6,865,440 B1* | 3/2005 | Yoneda | G05B 19/4069 318/560 |
| 2006/0284588 A1* | 12/2006 | Vau | B25J 9/1623 318/677 |
| 2011/0251710 A1 | 10/2011 | Hsu et al. | |
| 2017/0262572 A1* | 9/2017 | Mori | G06F 17/141 |
| 2017/0262573 A1* | 9/2017 | Mori | G06F 17/14 |

FOREIGN PATENT DOCUMENTS

| | | |
|---|---|---|
| CN | 101639667 A | 2/2010 |
| CN | 102023576 A | 4/2011 |
| CN | 102621990 A | 8/2012 |
| CN | 103365242 A | 10/2013 |
| CN | 103244137 B | 12/2014 |
| CN | 204177585 U | 2/2015 |
| CN | 105446166 A | 3/2016 |
| CN | 103180790 B | 4/2016 |
| CN | 106019984 A | 10/2016 |
| CN | 106597993 A | 4/2017 |
| CN | 107015524 A | 8/2017 |
| CN | 107272661 A | 10/2017 |
| TW | 266889 | 12/1995 |
| TW | M467530 U | 12/2013 |
| TW | I454868 B | 10/2014 |
| TW | 201518885 A | 5/2015 |
| TW | I512417 B | 12/2015 |

OTHER PUBLICATIONS

Lee et al., "A servo parameter tuning method for high-speed NC machine tools based on contouring error measurement," Department of Precision Engineering, Dec. 19, 2017, pp. 1-10.

Wang et al., "Development and Application of Parameter-Adjusting Technology for Determining the Best-Fitted Control Parameters of CNC Machine Tools," Graduate Insitutte of Manufacturing Technology, Jan. 2015, 55 pages.

Wu et al., "A Fuzzy Self-Tuning Feed-Forward Controller Considering Motion Command and Control Effort," Graduate Insitutte of Automation Technology, Jul. 2009, 98 pages.

Wu et al., "Identification of Optimal Parameters from CNC Controller by Using Genetic Algorithm," Proceeding of the 24$^{th}$ National Conference of the Chinese Society of Mechanical Engineers, 2007, 7 pages.

Kuo et al., "Servo parameter tuning for a 5-axis machine center based upon GA rules," Int'l Journal of Machine Tools & Manufacture 41 (2001) pp. 1535-1550.

* cited by examiner

TOOL MACHINE SERVO CONTROL SIMULATION DEVICE AND ESTABLISHING METHOD OF STRUCTURE MODEL

TECHNICAL FIELD

The disclosure relates in general to a servo control simulation device and an establishing method of controlled body model, and more particularly to a tool machine servo control simulation device and an establishing method of controlled body model.

BACKGROUND

A tool machine is composed of hundreds or even thousands of elements. During the assembly process of the elements, assembly error will inevitably occur. Even the elements manufactured in the same batch, their quality may not be the same (due to actual tolerance). Since the performance of each tool machine after assembly may vary, the tool machine must be tested and calibrated before the delivery of the tool machine. However, the testing method which requires the tool machine to have actual motion on a work platform is time consuming and has low efficiency.

SUMMARY

According to one embodiment, an establishing method of a controlled body model is provided. The establishing method of a controlled body model includes the following steps: receiving a plurality of time-domain position information, a plurality of time-domain velocity information and a plurality of time-domain torque information generated by a controlled body of a tool machine at a plurality of driving frequencies; respectively converting the time-domain position information, the time-domain velocity information and the time-domain torque information into a plurality of frequency-domain position information, a plurality of frequency-domain velocity information and a plurality of frequency-domain torque information; obtaining a plurality of frequency-domain position transfer response points and a plurality of frequency-domain velocity transfer response points according to the frequency-domain position information, the frequency-domain velocity information and the frequency-domain torque information; calculating the frequency-domain position transfer response points to obtain a position function; calculating the frequency-domain velocity transfer response points to obtain a velocity function; and, combining the position function and the velocity function with a drive property parameter.

According to another embodiment, a tool machine servo control simulation device is provided. The tool machine servo control simulation device includes a controlled body model and a processor. The controlled body model includes a drive property parameter. The processor includes a signal receiver and a function calculator. The signal receiver is configured for receiving a plurality of time-domain position information, a plurality of time-domain velocity information and a plurality of time-domain torque information generated by a controlled body of a tool machine at a plurality of driving frequencies. The function calculator is configured for: respectively converting the time-domain position information, the time-domain velocity information and the time-domain torque information into a plurality of frequency-domain position information, a plurality of frequency-domain velocity information and a plurality of frequency-domain torque information; obtaining a plurality of frequency-domain position transfer response points and a plurality of frequency-domain velocity transfer response points according to the frequency-domain position information, the frequency-domain velocity information and the frequency-domain torque information; calculating the frequency-domain position transfer response points to obtain a position function; calculating the frequency-domain velocity transfer response points to obtain a velocity function; and, combining the position function and the velocity function with the drive property parameter of the controlled body model.

According to an alternative embodiment, a tool machine servo control simulation device is provided. The tool machine servo control simulation device includes a controlled body model and a processor. The controlled body model includes a position function, a velocity function and a drive property parameter. The processor includes a control signal receiver and a simulation component. The control signal receiver is configured for receiving a servo command. The simulation component generates a simulation path according to the position function, the velocity function and the drive property parameter in response to the servo command.

The above and other aspects of the invention will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
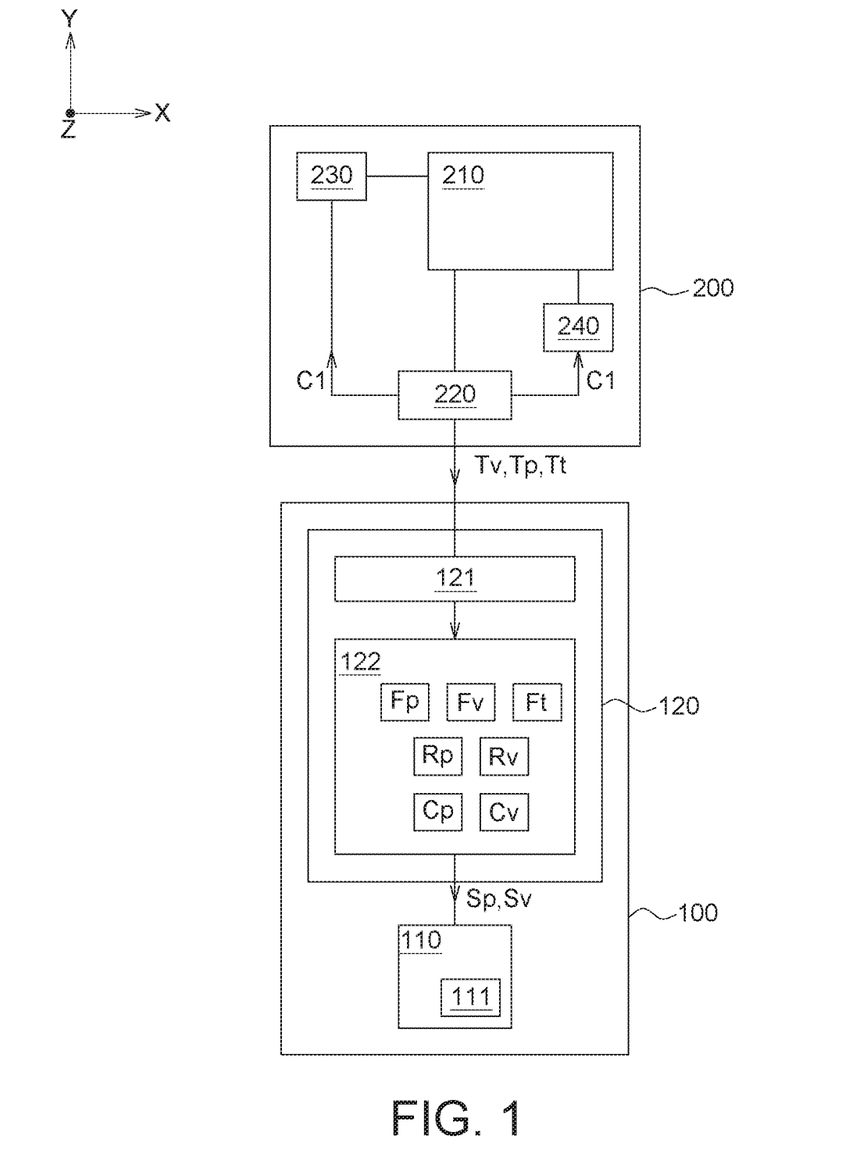
FIG. 1 is a top view of a tool machine servo control simulation system according to an embodiment of the present disclosure.

Referring to FIG. 1, a top view of a tool machine servo control simulation system 100 according to an embodiment of the present disclosure is shown. The tool machine servo control simulation device 100 includes a controlled body model 110 and a processor 120. The controlled body model 110 includes a drive property parameter 111. The processor 120 includes a signal receiver 121 and a function calculator 122. The signal receiver 121 is configured for receiving a plurality of time-domain position information $T_p$, a plurality of time-domain velocity information $T_v$ and a plurality of time-domain torque information $T_t$ generated by a controlled body 210 of a tool machine 200 at a plurality of driving frequencies. The function calculator 122 is configured for: (1) respectively converting the time-domain position information $T_p$, the time-domain velocity information $T_v$ and the time-domain torque information $T_t$ into a plurality of frequency-domain position information $F_p$, a plurality of frequency-domain velocity information $F_v$, and a plurality of frequency-domain torque information $F_t$; (2) obtaining a plurality of frequency-domain position transfer response points $R_p$ and a plurality of frequency-domain velocity transfer response points $R_v$ according to the frequency-domain position information $F_p$, the frequency-domain velocity information $F_v$ and the frequency-domain torque information $F_t$; (3) calculating the frequency-domain position transfer response points $R_p$ to obtain a position function $S_p$; (4) calculating the frequency-domain velocity transfer response points $R_v$ to obtain a velocity function $S_v$; and (5) combining the position function $S_p$ and the velocity function $S_v$ with the drive property parameter 111 of the controlled body model 110.

The controlled body 210, such as a work platform of the tool machine 200, is configured for placing a workpiece. The signal receiver 121 and the function calculator 122 can be realized by circuits formed by a semiconductor process. Besides, the signal receiver 121 and the function calculator 122 can be two separate elements or can be integrated as one single element.

Therefore, based on the drive property parameter 111, the position function $S_p$ and the velocity function $S_v$, a dynamic trajectory of the controlled body 210 of the tool machine 200 can be obtained through computer simulation in response to a predetermined processing path. In other words, the dynamic trajectory of the controlled body 210 can be quickly obtained through computer simulation without performing actual test. Furthermore, the trend of the dynamic trajectory matches the dynamic trajectory of the controlled body 210 obtained by actual test, and therefore has a high reference value. Detailed descriptions of the dynamic trajectory are disclosed below.

Figure 2:
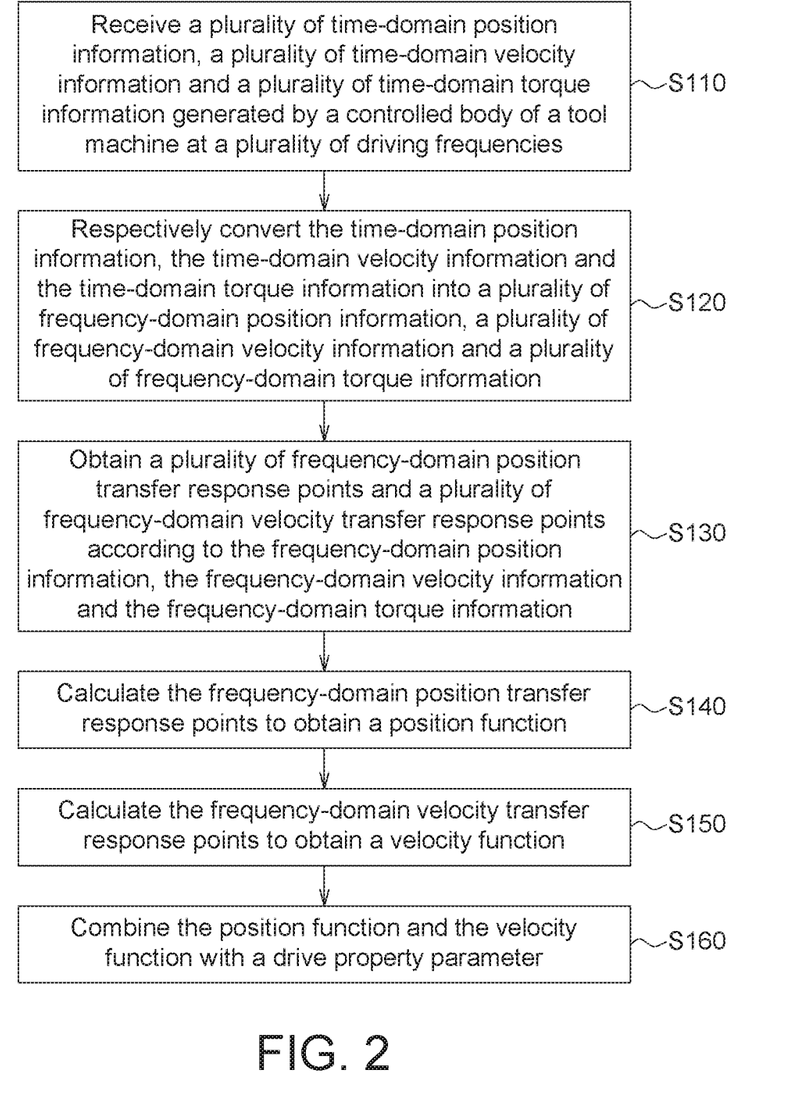
FIG. 2 is a flowchart of an establishing method of the controlled body model of FIG. 1.

The establishing method of the controlled body model 110 is exemplified below in details.

Referring to FIG. 2, a flowchart of an establishing method of the controlled body model 110 of FIG. 1 is shown.

Firstly, the method begins at step S110 with reference to FIG. 1, the controller 220 of the tool machine 200 receives a plurality of time-domain position information $T_p$, a plurality of time-domain velocity information $T_v$ and a plurality of time-domain torque information $T_t$ generated by a controlled body 210 at a plurality of driving frequencies. For example, the tool machine 200 further includes a first driver 230 and a second driver 240, and the drivers are such as motors. Under the driving frequencies, the controlled body 210 is driven by the first driver 230 and the second driver 240 to move along an XY plane. The XY plane is such as a placement surface (not illustrated) of a workpiece, and the Z-axis direction is such as the direction of rotation spindle of a cutting tool (not illustrated). In an embodiment, the tool machine 200 can be realized by a drilling machine, a milling machine or a computer numerical control (CNC) machine. In another embodiment, the tool machine 200 can be realized by a 3-axis tool machine. For example, the tool machine 200 further includes a third driver (not illustrated) connected to the spindle of the cutting tool (not illustrated) and controlled by the controller 220. Under the control of the controller 220, the third driver controls the spindle of the cutting tool to move along the Z-axis direction.

The first driver 230 can drive the controlled body 210 to move along an axial direction, such as the X-axis direction. The second driver 240 can drive the controlled body 210 to move along another axial direction, such as the Y axial direction.

When the controlled body 210 is controlled and moves, the controller 220 receives dynamic information from the controlled body 210. The dynamic information are such as the time-domain position information $T_p$, the time-domain velocity information $T_v$ and the time-domain torque information $T_t$ at each time point. Besides, the time-domain position information $T_p$, the time-domain velocity information $T_v$ and the time-domain torque information $T_t$ can also be obtained by analyzing and/or calculating the control signal of the driver by the controller 220. The information (that is, the time-domain position information $T_p$, the time-domain velocity information $T_v$ and the time-domain torque information $T_t$) at each time point are discrete values. Then, the controller 220 transmits the time-domain position information $T_p$, the time-domain velocity information $T_v$ and the time-domain torque information $T_t$ at each time point to the tool machine servo control simulation device 100. The signal receiver 121 of the processor 120 of the tool machine servo control simulation device 100 receives the time-domain position information $T_p$, the time-domain velocity information $T_v$ and the time-domain torque information $T_t$ at each time point. The time-domain position information $T_p$, the time-domain velocity information $T_v$ and the time-domain torque information $T_t$ are feedback signals of the controlled body 210 when performing motion.

In a method of obtaining the time-domain position information $T_p$, the time-domain velocity information $T_v$ and the time-domain torque information $T_t$, the controller 220 of the tool machine 200 outputs a plurality of control signal C1 to the first driver 230 and the second driver 240 of the tool machine 200 before step S110 is performed, wherein a plurality of control signals C1 are sine wave excitation signals having different frequencies. The sine wave excitation signals are inputted to the first driver 230 and the second driver 240 in an ascending order of the driving frequencies. The first driver 230 and the second driver 240 drive the controlled body 210 to vibrate according to each sine wave excitation signal. Moreover, the control signal C1 controlling the first driver 230 and the control signal C1 controlling the second driver 240 can be the same or different signals. The first driver 230 and the second driver 240 control the controlled body 210 to perform motion according to the control signal C1. When the controlled body 210 performs motion, the controller 220 can obtain the time-domain position information $T_p$ of the controlled body 210 through an optical scale (not illustrated) of the controlled body 210. Or, the controller 220 can obtain the time-domain position information $T_p$ of the controlled body 210 through the first driver 230 and the second driver 240. When the controlled body 210 performs motion, the controller 220 can obtain the time-domain velocity information $T_v$ and the time-domain torque information $T_t$ of the controlled body 210 through the first driver 230 and the second driver 240.

Then, the method proceeds to step S120, the function calculator 122 of the processor 120 respectively converts the time-domain position information $T_p$, the time-domain velocity information $T_v$ and the time-domain torque information $T_t$ into a plurality of frequency-domain position information $F_p$, a plurality of frequency-domain velocity information $F_v$, and a plurality of frequency-domain torque information $F_t$ by a Fourier frequency analysis technology.

Then, the method proceeds to step S130, the function calculator 122 obtains a plurality of frequency-domain position transfer response points $R_p$ and a plurality of frequency-domain velocity transfer response points $R_v$ according to the frequency-domain position information $F_p$, the frequency-domain velocity information $F_v$ and the frequency-domain torque information $F_t$.

Figure 3:
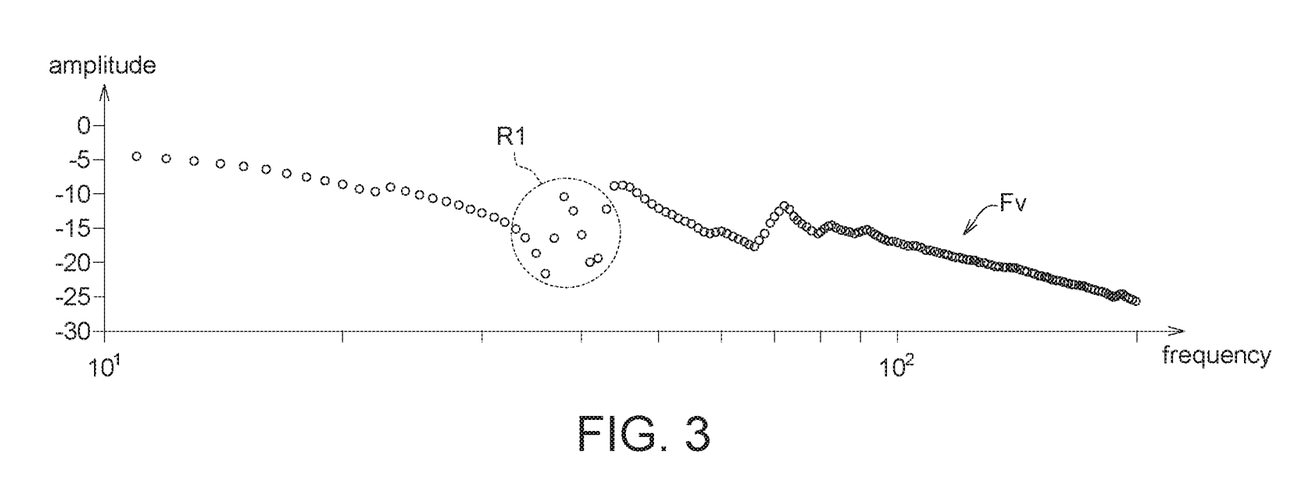
FIG. 3 is a schematic diagram of a plurality of frequency-domain position transfer response points according to an embodiment of the present disclosure.

Referring to FIG. 3, a schematic diagram of a plurality of frequency-domain velocity transfer response points $R_v$ according to an embodiment of the present disclosure is shown. The function calculator 122 calculates a position ratio $C_v$ of the frequency-domain velocity information $F_v$ to the frequency-domain torque information $F_t$ at the same frequency (that is, $C_v=F_v/F_t$). The velocity ratio $C_v$ is the frequency-domain velocity transfer response point $R_v$ under the same frequency. As indicated in the diagram, the frequency-domain velocity transfer response points $R_v$ are discrete data points.

Although it is not illustrated in the diagram, the function calculator 122 calculates a position ratio $C_p$ of the frequency-domain position information $F_p$ to the frequency-domain torque information $F_t$ at the same frequency (that is, $C_p=F_p/F_t$) by a similar method. The position ratio $C_p$ is the frequency-domain position transfer response points $R_p$ at the same frequency. The frequency-domain position transfer response points $R_p$ also are discrete data points.

Figure 4:
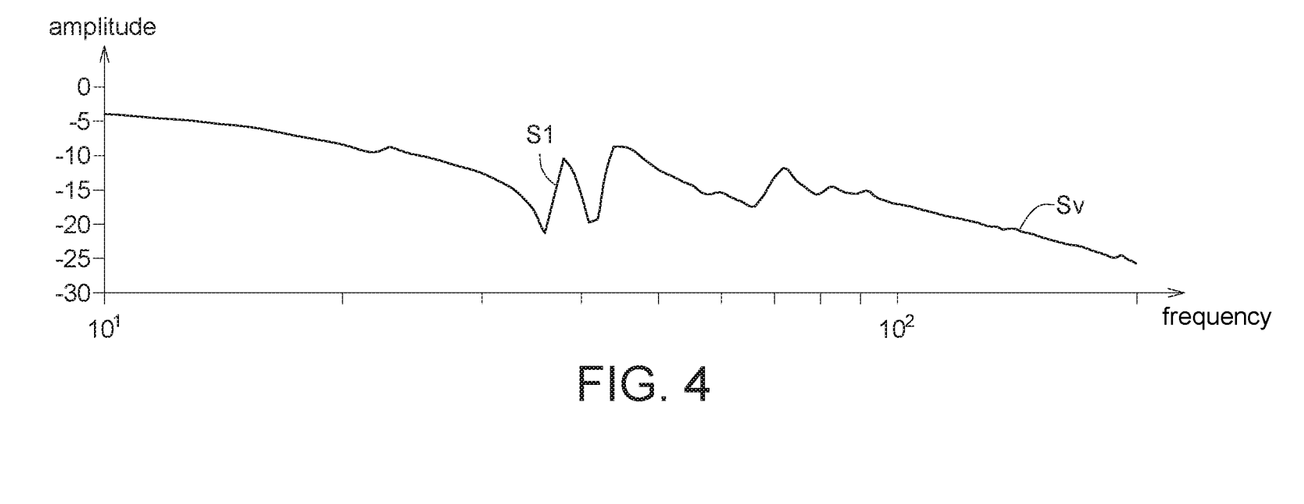
FIG. 4 is a schematic diagram of a position function according to an embodiment of the present disclosure.

In step S140, as indicated in FIG. 4, a schematic diagram of a position function $S_v$ according to an embodiment of the present disclosure. The function calculator 122 can calculate the frequency-domain velocity transfer response points $R_v$ of FIG. 3 by a curve fitting method to obtain the velocity function $S_v$. The frequency-domain velocity transfer response points $R_v$ have a discrete distribution, but the velocity function $S_v$ has a continuous distribution. As the quantity of frequency-domain velocity transfer response points $R_v$ increases, the speed of processing the frequency-domain velocity transfer response points $R_v$ by the processor 120 slows down. Since a large volume of frequency-domain velocity transfer response points $R_v$ have been fit to a curve equation, the processing burden of the processor 120 can be reduced (the processor 120 has less burden with the processing of a curve equation than the processing of a large volume of point signals).

Equation (1) is an equation of velocity function $S_v$. Through equation (1), a plurality of frequency-domain velocity transfer response points $R_v$ having larger amplitude variation can be fit to an approximate curve as indicated in FIG. 3. For the partial region R1 of FIG. 3, a plurality of frequency-domain velocity transfer response points $R_v$ distributed within the partial region R1 have larger amplitude variation than the frequency-domain velocity transfer response points $R_v$ distributed in the vicinity of the partial region R1. Through the segmental fitting of equation (1), a plurality of frequency-domain velocity transfer response points $R_v$ within the partial region R1 can be fit to an approximate partial curve S1 as indicated in FIG. 4, wherein s represents a complex frequency including a real portion and an imaginary portion.

$$S_v = \frac{1}{as} + \Sigma \frac{e*s}{s^2+cs+d} \quad (1)$$

In step S150, the function calculator 122 can calculate the frequency-domain position transfer response points $R_p$ by a curve fitting method to obtain a position function $S_p$. In comparison to the frequency-domain position transfer response points $R_p$ having a discrete distribution, the position function $S_p$ has a continuous distribution. As the quantity of the frequency-domain position transfer response points $R_p$ increases, the speed of processing the frequency-domain position transfer response points $R_p$ by the processor 120 slows down. Since a large volume of frequency-domain position transfer response points $R_p$ have been converted into a curve equation, the processing burden of the processor 120 can be reduced.

Equation (2) is an equation of position function $S_p$. Through equation (2), a plurality of frequency-domain position transfer response points $R_p$ having larger amplitude variation can be fit to an approximate curve. The fitting of equation (2) is similar to that of equation (1), and the similarities are not repeated.

$$S_p = \frac{1}{as^2} + \Sigma \frac{\pm 1}{bs^2+cs+d} \quad (2)$$

In step S160, the function calculator 122 combines the position function $S_p$ and the velocity function $S_v$ with a drive property parameter 111. The drive property parameter 111 is the known parameter and specification of the driver (such as motor). Examples of the drive property parameter 111 include power, rotation speed, frequency or any parameter relevant to the performance of the selected driver. The drive property parameter 111 represents the features of the driver (the first driver 230 and the second driver 240) of the tool machine 200. The position function $S_p$ and the velocity function $S_v$, also referred as the controlled body frequency response function, represent the dynamic features of the controlled body 210 of the tool machine 200. The model, which combines the features of the driver and the dynamic features of the tool machine, can represent the overall features of the tool machine 200. In other words, each tool machine 200 may select different brands of drivers (the first driver 230 and the second driver 240) and different types of controlled bodys 210. By combining the drive property parameter 111 of the selected driver with the position function $S_p$ and the velocity function $S_v$ of individual tool machine 200 (each tool machine has its own position function $S_p$ and its own velocity function $S_v$), the dynamic features of individual tool machine 200 can be quickly identified, so that the adjustment of the individual tool machine 200 in follow-up process can be made easier.

Figure 5:
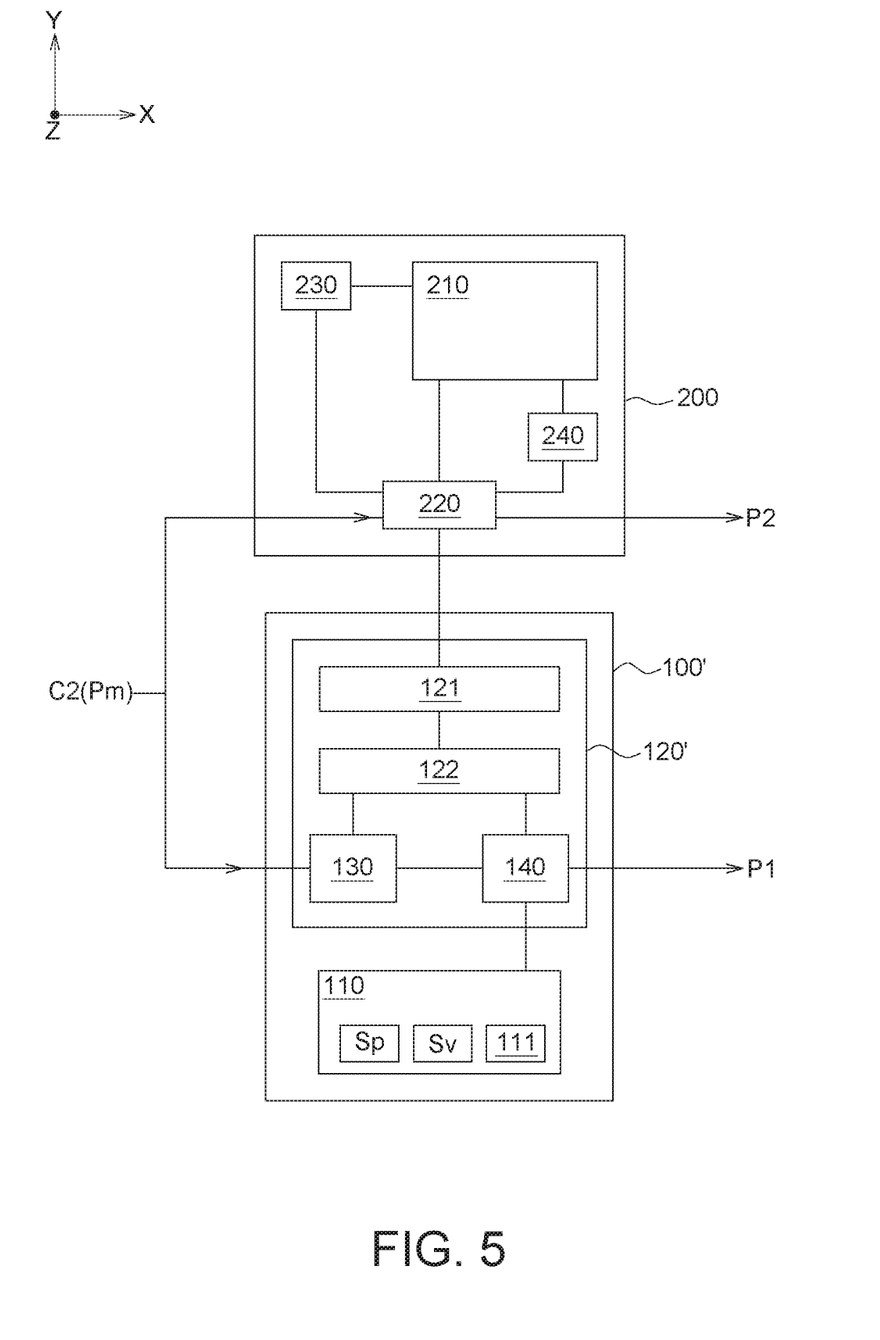
FIG. 5 is a schematic diagram of a tool machine servo control simulation device according to another embodiment of the present disclosure.
Figure 6:
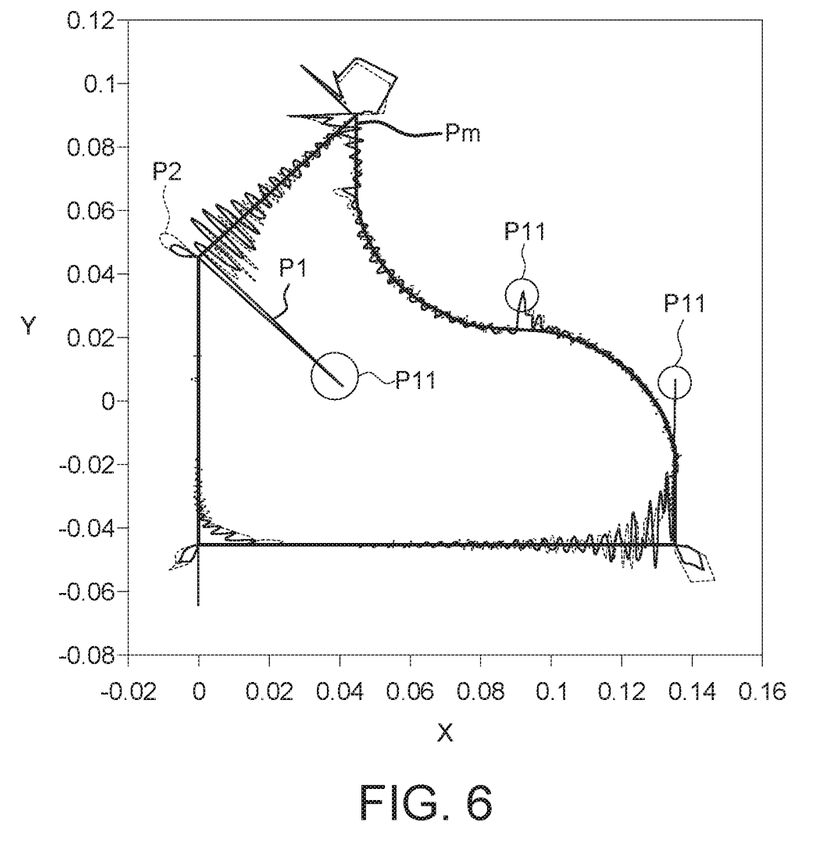
FIG. 6 is a simulation path chart obtained by a tool machine servo control simulation device of FIG. 5.

Referring to FIG. 5 and FIG. 6, FIG. 5 is a schematic diagram of a tool machine servo control simulation device 100' according to another embodiment of the present disclosure. FIG. 6 is a simulation path chart obtained by a tool machine servo control simulation device 100' of FIG. 5.

The tool machine servo control simulation device 100' includes a controlled body model 110 and a processor 120'. The controlled body model 110 includes a position function $S_p$, a velocity function $S_v$ and a drive property parameter 111. The features of the processor 120' are similar or identical to that of the processor 120 except that the processor 120' further includes a control signal receiver 130 and a simulation component 140. The signal receiver 121, the function calculator 122, the control signal receiver 130 and the simulation component 140 can be realized by circuits formed by a semiconductor process. Besides, the signal receiver 121, the function calculator 122, the control signal receiver 130 and the simulation component 140 can be a plurality of separate elements; or, at least two of the signal receiver 121, the function calculator 122, the control signal receiver 130 and the simulation component 140 can be integrated into one single element. In another embodiment, the processor 120' of FIG. 5 can omit the signal receiver 121 and/or the function calculator 122.

The control signal receiver 130 is configured for receiving a servo command C1. The simulation component 140 generates a simulation path P1 according to the position function $S_p$, the velocity function $S_v$ and the drive property parameter 111 in response to the servo command C1. The servo command C1 is for driving the controlled body 210 to move along a movement path $P_m$. As indicated in FIG. 5, the same servo command C1 is inputted to the tool machine 200. The controller 220 of the tool machine 200 outputs an actual-test path P2 (plotted as a dotted line).

As indicated in FIG. 6, the movement path $P_m$ (ideal path), a simulation path P1 and an actual-test path P2 are illustrated in FIG. 6. It can be seen from the diagram that the movement path $P_m$, the simulation path P1 and the actual-test path P2 all have errors. As indicated in the diagram, the trend of the simulation path P1 matches that of the actual-test path P2. For example, both the simulation path P1 and the actual-test path P2 have dynamic changes (such as jitterings) at the path bends P11 (such as the bends or the inflection points) of the movement path $P_m$. The jitterings are deviated from the movement path $P_m$. Thus, the simulation path P1 has a certain reference value. Furthermore, the simulation path P1 has larger sensitivity at the path bends P11. For example, in comparison to the actual-test path P2, the simulation path P1 has a larger change (such as a larger amplitude of jittering) highlighting the dynamic changes at the path bends P11.

To summarize, the tool machine servo control simulation device and the establishing method of a controlled body model disclosed in the embodiments of the present disclosure analyze the features of a tool machine through computer simulation and output a position function and a velocity function. The position function and the velocity function can be combined with a drive property parameter to form a combined model which represents the overall features of the tool machine. Therefore, without changing the controller of the tool machine (for example, without changing the hardware/software design of the controller of the tool machine), the errors of the tool machine with respect to processing path can be quickly understood through computer analysis of the combined mode. As such, the processing performance of the tool machine can be quickly understood. In other words, the embodiments of the present disclosure provide a tool machine servo control simulation device and an establishing method of a controlled body model capable of replacing or simulating the controller of the tool machine and capable of testing the performance of the tool machine through computer simulation according to the position function and the velocity function without actually testing the tool machine.

In a method of obtaining the features of a tool machine, a digital model of the tool machine is established by software (such as finite element analysis). During the model establishing process, the digital model must be repeatedly adjusted, and a large volume of processing time is required for obtaining the features of the tool machine. According to the embodiments of the present disclosure, the tool machine is excited by a control signal and a feedback signal of the tool machine can be immediately obtained, and the position function and the velocity function can be obtained from the feedback signal. In comparison to the model establishing method using software, the embodiments of the present disclosure do not need to repeatedly adjust the digital model parameter, and therefore can identify the features of the tool machine more quickly.

The tool machine servo control simulation device and the establishing method of a controlled body model disclosed in above embodiments of the present disclosure can simulate the features of the tool machine through the improvement of computer software/hardware even when the original design of the tool machine remains unchanged (such as the tool machines that have been manufactured and ready to be delivered). Thus, the tool machine servo control simulation device and the establishing method of a controlled body model of the embodiments of the present disclosure can achieve a technical effect better than the physical effect obtained by changing the internal current or voltage of a computer when executing a program.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An establishing method of a controlled body model for simulating features of a controlled body of a tool machine, comprising:

receiving, by a signal receiver, a plurality of time-domain position information, a plurality of time-domain velocity information and a plurality of time-domain torque information generated by the controlled body of the tool machine at a plurality of driving excitation frequencies;

respectively, by a function calculator, converting the time-domain position information, the time-domain velocity information and the time-domain torque information into a plurality of frequency-domain position information, a plurality of frequency-domain velocity information and a plurality of frequency-domain torque information;

obtaining, by the function calculator, a plurality of frequency-domain position transfer response points and a plurality of frequency-domain velocity transfer response points according to the frequency-domain position information, the frequency-domain velocity information and the frequency-domain torque information;

calculating, by the function calculator, the frequency-domain position transfer response points through a curve fitting method to obtain a position function having continuous distribution;

calculating, by the function calculator the frequency-domain velocity transfer response points through the curve fitting method to obtain a velocity function having continuous distribution; and combining, by the function calculator, the position function and the velocity function with a drive property parameter to establish the controlled body model.

2. The establishing method according to claim 1, wherein the tool machine further comprises a controller and a driver, and the method further comprises:

outputting a control signal to the driver by the controller; and obtaining the time-domain position information, the time-domain velocity information and the time-domain torque information from the driver by the controller;

wherein the time-domain position information, the time-domain velocity information and the time-domain torque information are received from the controller in the step of receiving the time-domain position information, the time-domain velocity information and the time-domain torque information generated by the controlled body of the tool machine at the driving excitation frequencies.

3. The establishing method according to claim 1, wherein the step of obtaining the frequency-domain position transfer response points and the frequency-domain velocity transfer response points according to the frequency-domain position information, the frequency-domain velocity information and the frequency-domain torque information comprises:
   calculating a position ratio of the frequency-domain position information to the frequency-domain torque information at a frequency, wherein the position ratio is the frequency-domain position transfer response point at the frequency.

4. The establishing method according to claim 1, wherein the step of obtaining the frequency-domain position transfer response points and the frequency-domain velocity transfer response points according to the frequency-domain position information, the frequency-domain velocity information and the frequency-domain torque information comprises:
   calculating a velocity ratio of the frequency-domain velocity information to the frequency-domain torque information at a frequency, wherein the velocity ratio is the frequency-domain velocity transfer response point at the frequency.

5. A tool machine servo control simulation device for simulating features of a controlled body of a tool machine, comprising:
   a controlled body model, comprising a drive property parameter; and
   a processor, comprising:
   a signal receiver configured for receiving a plurality of time-domain position information, a plurality of time-domain velocity information and a plurality of time-domain torque information generated by the controlled body of the tool machine at a plurality of driving excitation frequencies;
   a function calculator configured for:
   respectively converting the time-domain position information, the time-domain velocity information and the time-domain torque information into a plurality of frequency-domain position information, a plurality of frequency-domain velocity information and a plurality of frequency-domain torque information;
   obtaining a plurality of frequency-domain position transfer response points and a plurality of frequency-domain velocity transfer response points according to the frequency-domain position information, the frequency-domain velocity information and the frequency-domain torque information;
   calculating the frequency-domain position transfer response points through a curve fitting method to obtain a position function having continuous distribution;
   calculating the frequency-domain velocity transfer response points through the curve fitting method to obtain a velocity function having continuous distribution; and
   combining the position function and the velocity function with the drive property parameter of the controlled body model.

6. The tool machine servo control simulation device according to claim 5, wherein the tool machine further comprises a controller and a driver; the controller is configured for outputting a control signal to the driver; the controller is configured for obtaining the time-domain position information, the time-domain velocity information and the time-domain torque information from the driver; and the signal receiver is further configured for receiving the time-domain position information, the time-domain velocity information and the time-domain torque information from the controller.

7. The tool machine servo control simulation device according to claim 5, wherein the function calculator is further configured for:
   calculating a position ratio of the frequency-domain position information to the frequency-domain torque information at a frequency in the step of obtaining the frequency-domain position transfer response points and the frequency-domain velocity transfer response points according to the frequency-domain position information, the frequency-domain velocity information and the frequency-domain torque information, wherein the position ratio is the frequency-domain position transfer response point at the frequency.

8. The tool machine servo control simulation device according to claim 5, wherein the function calculator is further configured for:
   calculating a velocity ratio of the frequency-domain velocity information to the frequency-domain torque information at a frequency in the step of obtaining the frequency-domain position transfer response points and the frequency-domain velocity transfer response points according to the frequency-domain position information, the frequency-domain velocity information and the frequency-domain torque information, wherein the velocity ratio is the frequency-domain velocity transfer response point at the frequency.

9. A tool machine servo control simulation device for simulating features of a controlled body of a tool machine, comprising:
   a controlled body model, comprising a position function, a velocity function and a drive property parameter; and
   a processor, comprising:
   a signal receiver configured for receiving a plurality of time-domain position info nation, a plurality of time-domain velocity information and a plurality of time-domain torque information generated by the controlled body of the tool machine at a plurality of driving excitation frequencies;
   a function calculator configured for:
   respectively, converting the time-domain position information, the time-domain velocity information and the time-domain torque information into a plurality of frequency-domain position information, a plurality of frequency-domain velocity information and a plurality of frequency-domain torque information;
   obtaining a plurality of frequency-domain position transfer response points and a plurality of frequency-domain velocity transfer response points according to the frequency-domain position information, the frequency-domain velocity information and the frequency-domain torque information;
   calculating the frequency-domain position transfer response points through a curve fitting method to obtain the position function having continuous distribution;

calculating the frequency-domain velocity transfer response points through the curve fitting method to obtain the velocity function having continuous distribution; and combining the position function and the velocity function with the drive property parameter to establish the controlled body model;

a control signal receiver configured for receiving a servo command; and a simulation component configured for generating a simulation path according to the controlled body model in response to the servo command.

\* \* \* \* \*